United States Patent [19]
Ambler et al.

[11] 3,791,260
[45] Feb. 12, 1974

[54] ROUTER

[75] Inventors: E. Curtis Ambler; Kestutis Damijonaitis, both of Newington; Paul A. Ketchpel, Simsbury, all of Conn.

[73] Assignee: The Stanley Works, New Britain, Conn.

[22] Filed: Feb. 17, 1972

[21] Appl. No.: 227,692

[52] U.S. Cl. .............................. 90/12 D, 144/134 D
[51] Int. Cl. ............................................. B23c 1/20
[58] Field of Search..... 90/12 D; 144/134 D, 136 C, 144/144 R

[56] References Cited
FOREIGN PATENTS OR APPLICATIONS
843,011  7/1952  Germany ........................ 144/134 D Primary Examiner—Francis S. Husar
Attorney, Agent, or Firm—Prutzman, Hayes, Kalb & Chilton

[57] ABSTRACT

A portable electric router having a large diameter helical compression spring encircling a router bit drive motor and biasing the motor to a retracted position, and an adjustable stop and one-way locking device for presetting and locking the motor in an extended operating position and providing for plunge cutting to a depth of cut established by the operation position of the motor.

5 Claims, 3 Drawing Figures

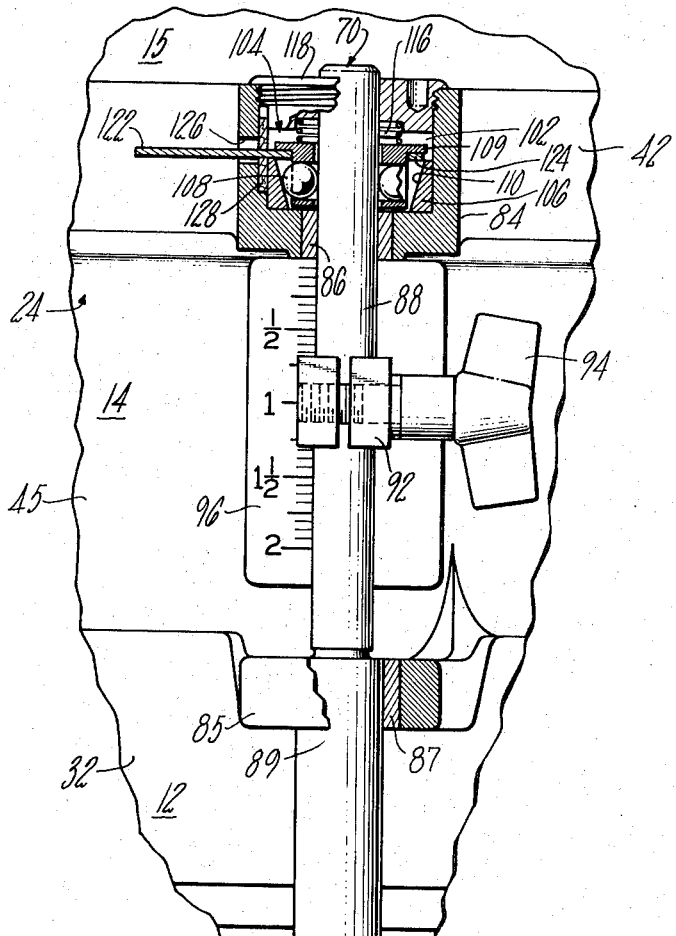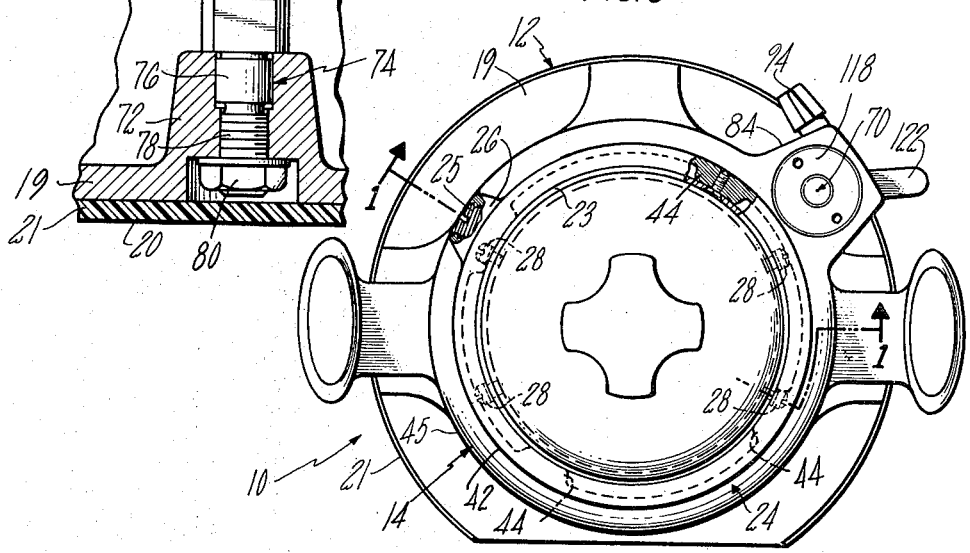

3,791,260

ROUTER

BRIEF SUMMARY OF THE INVENTION

The present invention relates generally to routers and more particularly to a router having new and improved means for establishing the depth of cut of the router.

It is a primary aim of the present invention to provide a new and improved portable electric router manually operable for keeping the router bit in a retracted position above a lower support base of the router between cutting operations and providing for plunge cutting to a pre-established depth.

It is another aim of the present invention to provide a new and improved router depth of cut setting mechanism facilitating retention of the router bit in a retracted safe position during nonuse.

It is a further aim of the present invention to provide a new and improved router of the type desribed having an economical and compact assembly of parts.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 2 is a partial side view, partly broken away and partly in section, of the router showing an adjustable stop and one-way locking device of the router; and FIG. 3 is a reduced top view, partly broken away and partly in section, of the router.

DESCRIPTION OF THE PREFERRED EMBODIMENT

Figure 1:
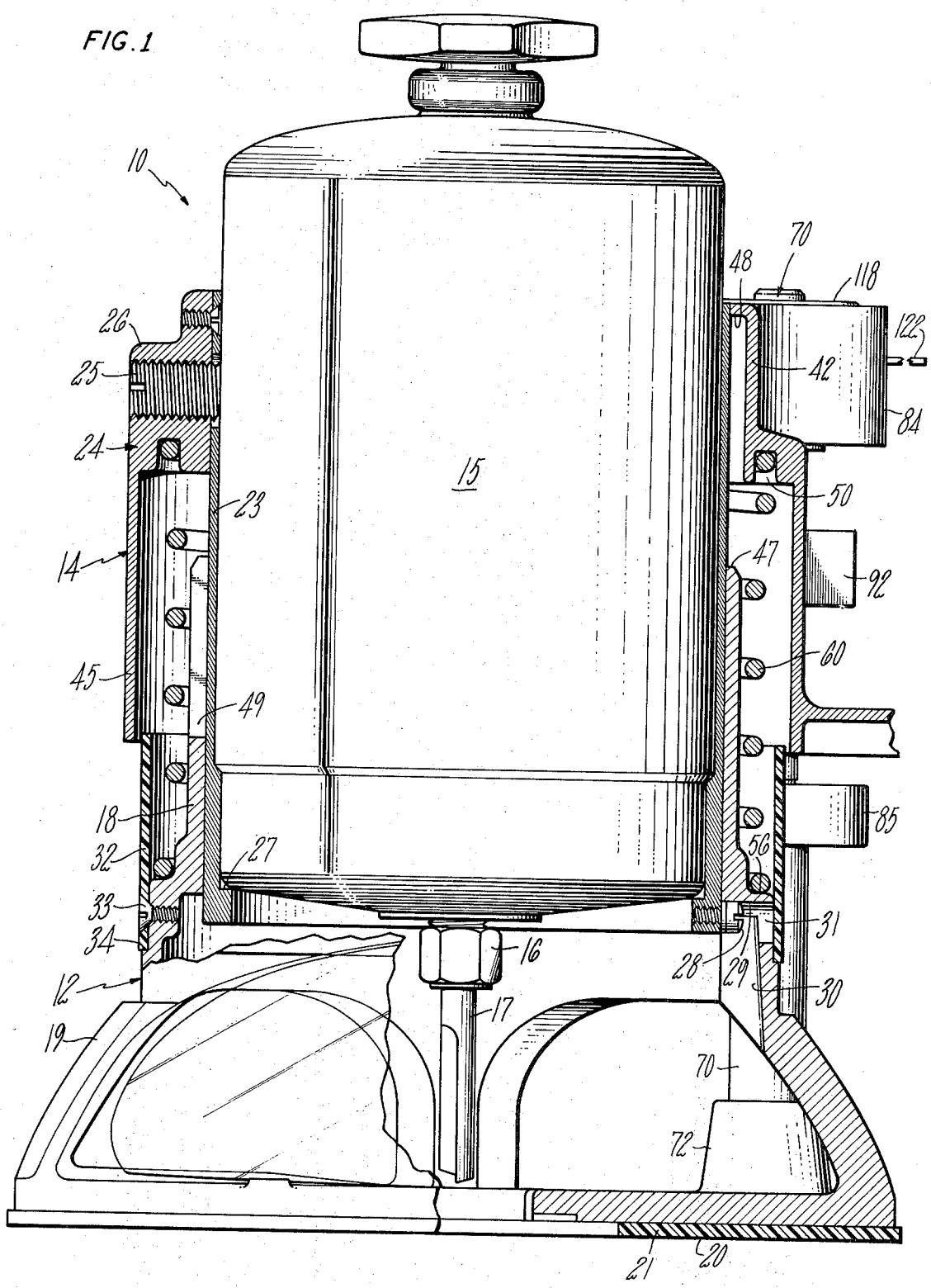
FIG. 1 is a side section view, partly broken away and partly in section, taken substantially along line 1—1 of FIG. 3 of a preferred embodiment of a router incorporating the present invention.

Referring now to the drawings in detail, wherein like numerals represent like parts throughout the several figures, a preferred embodiment 10 of a router incorporating the present invention comprises a base subassembly 12 and a motor subassembly 14 having in a conventional manner an electric motor 15 which a driven collet 16 for supporting a suitable router bit 17. The base subassembly 12 and motor subassembly 14 may for example be generally like that shown in U. S. Pat. No. 3,587,387 of Milford D. Burrows, et al. and entitled ROUTER, excepting that the motor subassembly 14 and base subassembly 12 are differently designed for supporting the motor subassembly 14 on and adjusting it relatively to the base subassembly 12 in accordance with the present invention.

More particularly, the base subassembly 12 comprises by a base casting 19 with an upstanding support collar 18 and a plastic base plate 21 with a flat support face 20. The motor subassembly 14 comprises a motor support sleeve 23 with an outer teflon coated cylindrical surface for supporting the motor 15 within a conforming cylindrical bore of the support collar 18 for relative movement of the subassemblies 12, 14 parallel to the motor shaft axis and perpendicular to the flat support face 20. A cast ring 24 (described hereinafter in more detail) is mounted on the upper end of the motor support sleeve 23, and a large set screw 25 is mounted in a lug 26 of the ring 24 and extends through an opening in the sleeve 23 to bear against the motor 15 such that the motor 15 can be inserted into the sleeve 23 to engage a lower inner lip 27 thereof and be locked in place by the set screw 25. Four angularly spaced threaded fasteners 28 are screwed into the lower end of the sleeve 23 such that the fastener heads are engageable with a lower edge 29 of the support collar 18 to provide a stop for establishing the upper limit position, shown in FIG. 1, of the motor subassembly 14 relative to the base subassembly 12. Suitable slots 30 and transverse openings 31 are provided in the base casting 19 for receiving the fastener heads and for removing the fasteners 28 for permitting removal of the motor subassembly 14.

An upstanding cylindrical shield 32 is secured by suitable threaded fasteners 33 onto the base casting 19 with the lower edge of the shield 32 engaging a shoulder 34 formed on the base casting 19 and such that the shield extends upwardly coaxially with the support collar 18 to enclose the lower end of the collar. The cast ring 24 has a collar 42 secured onto the motor support sleeve 23 by threaded fasteners 43 extending outwardly through the sleeve into the lug 26 and three additionally angularly spaced lugs 44 of the collar 42. The ring 24 has an enlarged depending cylindrical skirt or shield 45 having a larger diameter than the upstanding shield 32 and which, as shown in FIG. 1, slightly overlaps the upstanding shield 32 with the motor subassembly 14 in its fully retracted position. The coaxial cylindrical shields 32, 45 are dimensioned for telescoping association to permit the motor subassembly 14 to be shifted axially downwardly from its upper or fully retracted position. The lower limit position of the motor subassembly 14 on the base subassembly 12 is established by the engagement of the upper edge 47 of the motor support collar 18 with the inner edge 48 of the ring 24. The base support collar 18 accordingly has suitable notches 49 for receiving the mounting lugs 26, 44.

A downwardly opening annular groove 50 is provided in the ring 24 inwardly of the depending skirt 45 and an opposed upwardly facing annular shoulder 56 is provided on the base casting 19 inwardly of the upstanding shield 32. A large diameter generally helical compression spring 60 encircling the motor support collar 18 is mounted between the annular shoulder 56 and annular groove 50 to bias the motor subassembly 14 to its fully retracted position. The compression spring 60 as well as the motor support collar 18 and an intermediate portion of the motor support sleeve 23 are encased by the shields 32, 45 to provide for protecting the bearing surfaces of the sleeve 23 and collar 18 against foreign matter and for preventing contact by the motor operator with the compression spring 60.

A combined guide and locking rod 70 is supported upright on a lug 72 of the base casting 19. The rod has a lower reduced end 74 with a cylindrical portion 76 for accurately locating the rod 70 to extend parallel to the motor or router bit axis ana a threaded portion 78 for securing the rod to the base casting 19 with a nut 80. The ring 24 has a pair of axially spaced lugs 84, 85 with oil impregnated bushings 86, 87 respectively receiving upper and intermediate portions 88, 89 respectively of the rod 70. The motor subassembly 14 is thereby angularly keyed to the base subassembly 12 and guided for axial movement relative to the base subassembly.

A generally U-shaped collar 92 is mounted on the upper portion 88 of the rod 70 between the lugs 84, 85 and a threaded winged fastener 94 is received in an opening 95 in one leg of the collar and threaded into the other leg of the collar for manually locking and unlocking the collar to the rod 70. Accordingly, the collar can be adjustably positioned on the upper portion 88 of the rod 70 between the lugs 84, 85 and thereby provides an adjustable stop for setting a lower operating postion of the motor subassembly 14 with the lower face of the upper lug 84 in engagement with the upper face of the stop collar 92. A scale 96 is mounted on the skirt 45 for directly reading the permitted amount of axial displacement of the motor subassembly established by the stop collar 92.

The router bit is preferably mounted in the collet 16 so that, with the motor subassembly 14 fully retracted, the end of the router bit is above the lower face 20 of the base subassembly 12. In that event, the reading on the scale 96 (at the upper face of the collar 92) equals the total of such distance plus the available depth of cut. The stop collar 92 is accordingly set to establish the desired depth of cut.

The upper lug 84 is formed with a cylindrical cavity 102, and a releasable one-way lock assembly 104 is mounted within the cavity 102 for locking the motor subassembly 14 in its extended or operating position in engagement with the stop collar 92. The lock assembly 104 comprises an axially tapered ring or wedge 106 press fit within the cavity 102 and a pluraltiy of angularly spaced locking balls 108 mounted within a suitable ball cage 109 for engagement with a wedging surface 110 of the ring and the outer cylindrical surface of the rod portion 88. The ball cage 109 is biased downwardly by a helical compression spring 116 mounted between the ball cage 109 and a cap 118 threaded into the outer end of the cavity 102. The balls 108 are thereby biased into engagement with the wedging surface 110 and rod 70 and the axial taper of the surface 110 is selected to provide a one-way lock for locking the motor subassembly 14 to the rod 70 against the bias of the main return spring 60. In the shown embodiment a taper of 26° is used and the balls 108 are preferably roughened as by sand blasting and the rod portion 88 has a ground finish with a black oxide finish to provide improved locking.

A lock release lever 122 having an inner ring portion 124 mounted on the ball cage 109 is provided for pivoting the ball cage 109 upwardly against the bias of the compression spring 116 (e.g., by lifting manually the lever 122) and for thereby withdrawing the locking balls to disengage the lock and permit the motor subassembly 14 to be retracted by the spring 60 to its fully retracted position. The lever 122 extends through an opening 126 in the lug 84 and a washer or seal 128 is mounted on the lever 122 to provide a cover for the opening 126 to exclude foreign matter from the lock cavity 102.

Thus it can be seen that the depth of cut of the router can be readily established by selectively positioning the stop collar 92 and by then depressing the motor subassembly 14 against the bias of the spring 60 until it engages the stop collar 92. The router can be employed for plunging the router bit into a workpiece by presetting the stop collar 92 as desired, placing the router on the workpiece, turning the router motor on and depressing the motor subassembly 14 until it engages the stop collar 92.

As will be apparent to persons skilled in the art, various modifications, adaptations and variations of the foregoing specific disclosure can be made without departing from the teachings of the present invention.

We claim:

1. In a portable router having a base subassembly with a motor support and a bottom router supporting face and a router bit drive motor subassembly mounted on the motor support with its axis extending perpendicular to the router supporting face and for axial adjustment relative to the base subassembly for adjusting the depth of cut of the router, the improvement wherein the router comprises spring means axially biasing the motor subassembly in one axial direction relative to the base subassembly for retracting the drive motor subassembly, wherein one of said subassemblies comprises a rod extending parallel to the axis of relative movement of the subassemblies, wherein the other of said subassemblies comprises releasable one-way locking means engageable with the rod for locking the motor subassembly against movement in said one axial direction by the spring means, wherein the router comprises adjustable stop means for limiting the relative movement of the motor subassembly in the opposite axial direction and axially adjustable for presetting the depth of cut of the router, wherein the motor support is a collar and the router bit drive motor subassembly comprises a motor mounted within the collar for said axial adjustment, wherein the base and motor subassemblies have axially spaced opposed annular surfaces encircling the motor, and wherein the spring means comprises a helical compression spring interposed between said opposed annular surfaces for biasing the motor subassembly in said one axial direction.

2. In a portable router having a base subassembly with a motor support and a bottom router supporting face and a router bit drive motor subassembly mounted on the motor support with its axis extending perpendicular to the router supporting face and for axial adjustment relative to the base subassembly for adjusting the depth of cut of the router, the improvement wherein the router comprises spring means axially biasing the motor subassembly in one axial direction relative to the base subassembly for retracting the drive motor subassembly, wherein one of said subassemblies comprises a rod extending parallel to the axis of relative movement of the subassemblies, wherein the other of said subassemblies comprises releasable one-way locking means engageable with the rod for locking the motor subassembly against movement in said one axial direction by the spring means, wherein the router comprises adjustable stop means for limiting the relative movement of the motor subassembly in the opposite axial direction and axially adjustable for presetting the depth of cut of the router, and wherein the releasable one-way locking means comprises a plurality of locking balls around the rod, and an annular axially tapered ring surrounding the balls and operable to wedge the balls into engagement with the rod to lock the motor subassembly against movement in said one axial direction.

3. A router according to claim 1 wherein the motor subassembly comprises a ring encircling the motor and having a first of said opposed annular surfaces and an annular depending skirt encircling said compression spring, and wherein the base subassembly comprises an annular upstanding shield encircling the compression spring and having a telescoping relationship with said skirt permitting said axial adjustment of the motor subassembly.

4. A router according to claim 2 wherein the releasable one-way locking means comprises a ball cage, cage spring means for biasing the ball cage in one direction for positioning the balls for being wedged by the ring into locking engagement with the rod, and means for manually retracting the ball cage against the bias of the cage spring means for releasing said locking engagement.

5. A router according to claim 1 wherein the motor subassembly comprises a sleeve surrounding the motor and having an outer generally cylindrical surface for mounting the motor within the collar for said axial adjustment, a depending skirt mounted on said sleeve encircling the compression spring, router and handle means on the depending skirt.

* * * * *